United States Patent [19]
Borrkfield

[11] 3,762,243
[45] Oct. 2, 1973

[54] METHODS OF MAKING SHARP-EDGE CUTTING ELEMENTS

[76] Inventor: Richard A. Borrkfield, 90 Spring Ln., Canton, Mass.

[22] Filed: Mar. 13, 1972

[21] Appl. No.: 233,967

Related U.S. Application Data

[63] Continuation-in-part of Ser. No. 883,841, Dec. 10, 1969, and a continuation-in-part of Ser. No. 651,486, July 6, 1967, abandoned.

[52] U.S. Cl. .............................. 76/104 R, 204/143
[51] Int. Cl. ......................... B21k 11/00, B23p 1/00
[58] Field of Search ...................... 76/104 A, 104 R; 204/142, 143

[56] References Cited
UNITED STATES PATENTS

| | | | |
|---|---|---|---|
| 2,408,790 | 8/1946 | Mack | 76/104 R |
| 1,770,157 | 7/1930 | Humphries | 76/104 R |
| 2,288,184 | 6/1942 | Dodson et al. | 76/104 R |
| 2,361,554 | 10/1944 | Lundbye | 76/104 R |
| 3,468,195 | 9/1969 | La Cas | 76/104 R |
| 3,681,846 | 8/1972 | Gerber | 76/104 R |
| 3,490,314 | 1/1970 | Calnan | 76/104 R |

FOREIGN PATENTS OR APPLICATIONS

| | | | |
|---|---|---|---|
| 237,030 | 5/1959 | Australia | 204/142 |

Primary Examiner—Harrison L. Hinson
Attorney—Abbott Spear

[57] ABSTRACT

Methods of making sharp-edged cutting elements are disclosed in which one of two opposite surfaces of a work piece has a thin layer added thereto. The work piece is of a metal that is capable of having a cutting edge formed thereon and is subject to electrolytic attack. The added layer is less than 0.010 of an inch in thickness and is of a material capable of being fine ground. Work piece material is removed electrolytically from the other of said work piece surfaces in an area exposing an edge of the added layer which is simultaneously fine ground with an abrasive in the order of and preferably less than 50 microns in size. The material of the added layer is so inert to the electrolyte that it is substantially unaffected thereby while being fine ground.

12 Claims, 15 Drawing Figures

PATENTED OCT 2 1973
3,762,243
SHEET 1 OF 4
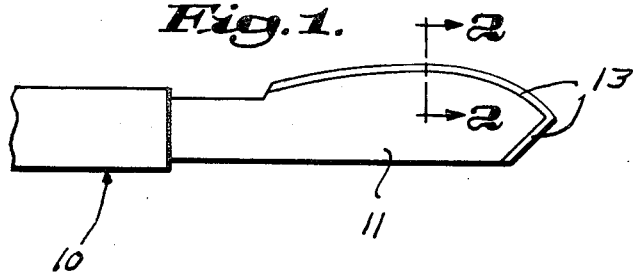
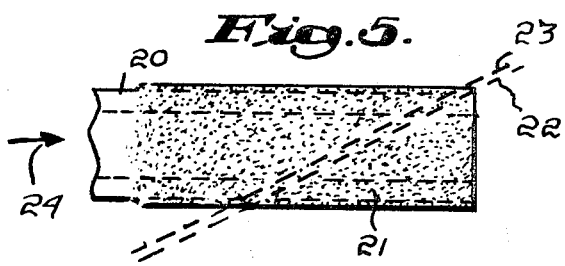
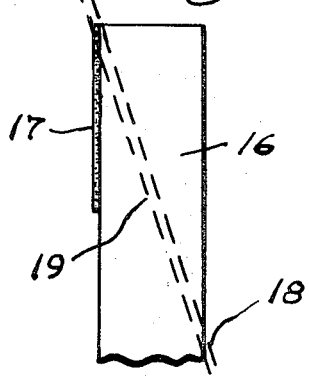
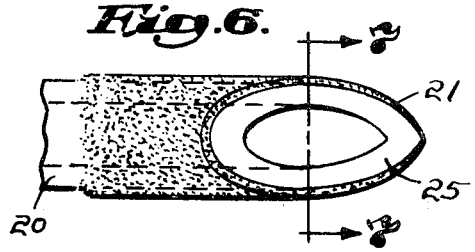
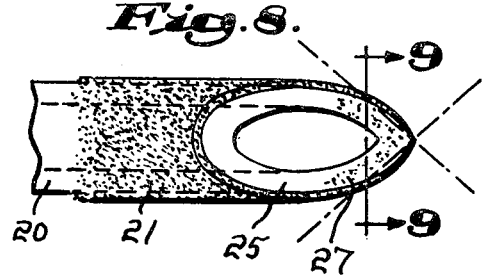

ELECTRO-CHEMICALLY ERODED

PATH OF ABRASIVE
(50 MICRONS OR LESS)

METHODS OF MAKING SHARP-EDGE CUTTING ELEMENTS

The present invention relates to sharp edged devices and their production and the present application is a continuation-in-part of my copending application Ser. No. 883,841, filed Dec. 10, 1969 and my earlier application Ser. No. 651,486, filed July 6, 1967, now abandoned.

BACKGROUND OF THE INVENTION

There are many applications where a fine sharp edge is required on a tool, implement, or device. Specifically in the manufacture of items requiring an edge of extreme sharpness, not subject to heavy loads or shock and not usually subject to resharpening, such, for examples, as razor blades, hypodermic needles, blood lancets, microtome blades, biopsy devices, scalpels, scrapers, or other edged tools, usually, but not necessarily, of a disposable nature, the cutting edge is the first and primary consideration. When these are designed to be disposable, the cost of producing this edge is a matter of prime consideration. Whether designed for one use or multiple reuse, the actual usable life of such items is dependent on the extent to which this edge broadens and thus dulls. This may be only a matter of a few millionths of an inch and may be due to wear, chipping, bending or corrosion. Therefore, this final edge should be wear resistant, have a high tensile, high modulus of rigidity, and not readily corroded.

In grinding any material to a fine sharp edge, many difficulties are encountered. At the very edge there are apt to be metallurgical changes involved due to heat and pressure causing loss of temper in some cases, brittleness and chipping in others, burring with subsequent removal problems in still others, or any combination of these. In stainless steel, used for many of the aforementioned items, these problems are especially severe as the material tends to drag to feather edges which must be removed without dulling the edge, usually involving a slow and expensive honing process to accomplish the desired sharpness.

The so-called electrolytic grinding of metallic stock offers a method which obviates most of the problems created by heat and pressure as neither are present in electrolytic grinding.

In the U.S. Pat. to Keeleric, No. 2,826,540, combined electrolytic and abrasive grinding is detailed with work pieces that are electrically conductive and with a rotatable electrode having a working face of electrically conductive material against which a conductive electrolytic liquid is directed. Electrically insulating, abrasive particles project from the working face of the electrode to fix the spacing between it and the work pieces, the abrasive particles being spaced from each other. A high density, low voltage current is so utilized that the spaces between the abrasive particles in which the electrolyte flows, function as a cathode. Material is thus removed from the work piece by an electrolytic attack and also, in some instances, by abrasion which may be a diamond or other suitable abrasive.

Work hardening, loss of temper, brittleness, dragging of the softer materials, and breakdown of the surface structure are avoided due to the nature of such a process. However, the effect of this grinding system extends back from an edge, creating a rounded surface unsuitable for cutting purposes such as hypodermic needles, razor blades and the like. Insulating coatings have been proven mostly unsatisfactory for the purpose and in addition must be removed after the grinding.

THE PRESENT INVENTION

It is my purpose to produce a better, sharper, more durable edge by the addition of a coating or layer on the edge of a work piece of a base metal, the coating material itself providing the actual cutting edge. This coating material is, depending on type and use and on the base metal, of thicknesses ranging from a few millionths to several thousandths of an inch. The coating material further has the property of suitability for a cutting edge for its specific application. It is further such that it is virtually unaffected by electrolytic action in the grinding process to be described. This last named property of the material is also of importance in a cutting edge, especially one such as a razor blade, that is to be subjected to moisture or other corrodants for the keenness of an edge may be corroded or oxidized away in a short space of time.

While any base metal may be used that can itself be edged, such steels as mild steel, stainless steel, alloy steel, and also aluminum are best adapted for use in cutting members and the invention is, accordingly, discussed with particular reference thereto. The coatings include the following metals or their alloys: platinum, rhodium, ruthenium, palladium, osmium, titanium, ceramics, a term including glass and anodizing on aluminum. The layers of edge forming materials may be applied in the following ways: Electroplating, electrodeposition, flame plated or flame sprayed by any technique, laminating, casting with the base metal and rolling as used in so-called filled jewelry, anodizing or hard anodizing, flow or spray coating for porcelain or other ceramics, or by alloy electroplating.

The layers from which the cutting edges are formed involve only amounts and depths of extremely small magnitude. The surface layer material may be laminated to a much thicker base material and rolled or drawn maintaining the same proportions of thickness to arrive at a raw material for electrolytic grinding to achieve the desired result of surface layer thickness less than 0.010 of an inch. Electroplating and other methods of forming the coating, on the other hand, can be accomplished directly to the required thicknesses in the range of a few millionths to several thousandths of an inch. These surface layer materials are not necessarily electrically insulating and are selected for their ability to perform as a cutting edge and to be of sufficiently different composition so as to allow the selection of an electrolytic solution which will not materially affect them while operating to remove the base material during the electrolytic grinding process. With the base materials and surface layers above referred to, commercially available electrolytic solutions such as Anocut 90 sold by Anocut Engineering Company of Chicago, Illinois, has proved satisfactory while working more efficiently with some materials than with other.

Work pieces are provided on one of two opposed surfaces with a layer less than 0.010 of an inch, the layer being of a material that is capable of being mechanically ground but is relatively inert to an electrolytic attack. The work piece is of a metal capable of being edged and being electrolytically attacked and after said one surface has the thin layer added thereto, the other surface is then electrolytically ground or eroded to expose an edge portion of the surface layer which exposed edge portion is simultaneously mechanically ground to provide a cutting edge, the mechanical grinding being effected by an abrasive whose maximum size is in the order of 50 microns (270 mesh) and preferably smaller, the abrasive being either carried by the working face of the electrolytic grinding wheel or by the electrolyte. In the case of a cannula, its inner and outer surfaces are the two opposed surfaces.

Electrolytic grinding uses abrasive particles that are substantially larger in size as the abrasive does not function to determine the fineness of the finished surfaces. The finest abrasive with which commercially available wheels are provided is 150 mesh. On the other hand, cutting edges that are mechanically produced have hitherto required a series of sharpening operations commencing with relatively coarse stock removed and finishing with a fine honing.

By way of contrast, the present invention enables a finished cutting edge to be economically formed in one operation in which the treated work piece surface bears no evidence of the mechanical grinding that is characteristic of the use of conventional rotatable electrodes. With conventional rotatable electrodes the abrasive particles would leave marks on the work piece which are evident even though they are themselves noticeable eroded by the electrolyte. The edge of the added layer would, if ground with conventional abrasives, 150 mesh or larger, be unsatisfactory and would not, of course be affected by the electrolyte. While electrolytic attack could be continued to remove the marks left by the abrasive, no improvement in the cutting edge would result. In electro-chemical erosion in accordance with the invention, however with the abrasive smaller than and never materially in excess of 50 microns (270 mesh) in size, a fine ground cutting edge is formed. Abrasives of the size used are those used in lapping procedures.

BRIEF DESCRIPTION OF THE DRAWINGS

In the accompanying drawings, there are shown illustrative embodiments of the invention from which these and other of its objectives, novel features, and advantages will be readily apparent.

In the drawings:

FIG. 1 is a fragmentary side view of a scalpel in accordance with the invention;

FIG. 2 is a fragmentary section through the edge thereof on a substantial increase in scale with the grinding operation indicated in broken lines;

FIG. 3 is a side view of a single edged razor blade in accordance with the invention;

FIG. 4 is a fragmentary section of the blank from which it was formed with the combined operation indicated in broken lines;

FIG. 5 is a side elevation of a length of coated tubing with the combined operation being schematically illustrated;

FIG. 6 is a plan view of the point-defining bevel formed thereby;

FIG. 7 is a section taken approximately along the indicated lines 7—7 of FIG. 6;

FIG. 8 is a view similar to FIG. 6 illustrating a subsequent combined operation after the thus-established bevel has been coated in accordance with the invention to be ground along the indicated broken lines;

FIG. 9 is a section approximately along the indicated lines 9—9 of FIG. 8 after such additional electro-chemical grinding;

PREFERRED EMBODIMENTS OF THE INVENTION

In FIG. 1, a scalpel is generally indicated at 10 and its blade 11 is shown as having a rough-formed cutting edge defined by the bevel 12 and provided with a thin coating 13 that is less than 0.010 of an inch in thickness. The coating 13 is shown as coextensive with the rough-formed edge 12 but it may extend over the whole or any part of the beveled face of the blade 11.

Figure 15:
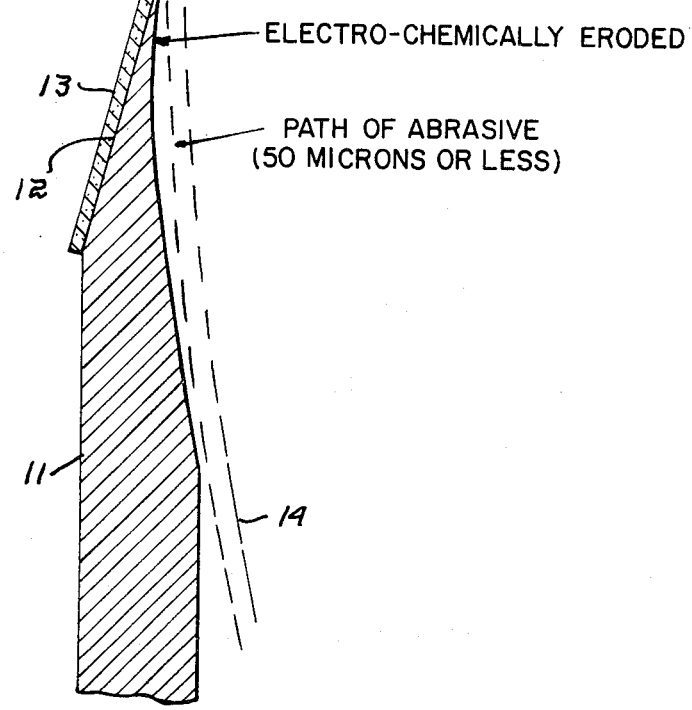
FIG. 15 is a view, similar to FIG. 2, but showing the effect of the electro-chemical erosion.

In FIG. 2, the electrolytical grinding of the blade 11 is illustrated with the working face of a rotatable electrode being indicated by the broken line arc 14 and the path of the spaced, protruding abrasive particles being represented by the broken line arc 15. As illustrated in FIG. 15, such grinding results in an electrolytic attack on the base metal of the blade 11 that is beyond the path 15 of the abrasive particles and in its removal adjacent the edge 12 to an extent exposing the edge of the layer 13 which is fine ground by the abrasive particles.

In FIG. 3, a razor blade 16 is shown as having a protective coating 17 on one face applied lengthwise along one edge, the edge being shown as unbeveled as the rough-forming of the edge is an optional procedure that is often unnecessary as when the work piece is itself thin. The blade 16 may be separately formed, cut from a similarly coated length, or itself be a band of considerable length. As indicated in FIG. 4, the blade 16 is edged by having the coating 17 marginally exposed by electrolytically removing base material and by fine grinding that exposed margin with the working face of the rotatable electrode and the path of its spaced, abrasive particles being indicated by the broken lines 18 and 19, respectively, the flat side of a wheel having been used. The electro-chemical erosion extends beyond the path 19.

In FIG. 5, a section of tubing 20 is shown as having a surface coating 21 at one end although it will be understood that it may be coated throughout its length and that it may be cut from a coated length. The tubing 20 is ground as illustrated by FIG. 5 with the flat working face of the rotatable electrode being indicated by the broken lines 22, the path of its spaced, abrasive particles represented by the broken line 23, and with the flow of the electrolyte being through the tubing 20 as indicated by the arrow 24.

The finished point of the thus formed hypodermic needle is shown in FIG. 6 with the bevel 25 exposing the coating 21 as a cutting edge that is fine ground, and, see FIG. 7, it will be noted that the use of the tubing 20 as a supply conduit for the electrolyte has utilized the previously referred-to "rounding" action to advantage in that it contributes to the sharpness of the tissue piercing point.

If a hypodermic needle point is to be of the type shown in FIG. 8, formed by intersecting bevels 26 opposite the beveled face 25, the face 25 is given a protective coat 27 and the surfaces 26 are subjected to an electrolytical removal after the coating 21 has been mechanically ground away where it would block such action.

In all of the above illustrations, the material of the work piece is any base metal capable of having an edge formed thereon and the edge-establishing coating thereon is any of the previously referred to coats and is applied by the appropriate procedure or procedures to which reference was made earlier, the coatings being less than 0.010 of an inch in thickness.

For most uses, mild steels, stainless steels and stainless steel alloys are used and, particularly in medical and related fields, stainless steel is preferred as being commonly accepted and in those fields the following metals or their alloys are usually preferred: Rhodium, iridium, and platinum.

For uses where impact on the cutting edges are not excessive, ceramic coatings are satisfactory and these may be applied to any base metal capable of meeting the requirements of use. For example, shredders and slitters do not present impact problems and while steels are still the preferred base materials, aluminum, brass, etc. could be used in many cases.

In the case of ceramic coatings, porcelain enamel, for example, composed typically of feldspar, whiting, ball clay, kaolin and silica may be applied by any of the above referred-to methods to the blade or other work piece with masking of areas not to be coated being optional. Spray coating is preferred as being the most common. The blade is then fired at a suitable temperature with the temperature being in the 1200° to 2500° F range, depending on the porcelain composition. The blade is then sharpened by the combined operation as previously described.

A similar procedure with similarly prepared blank utilizes a flame plated aluminum ceramic coating. This type of coating is mentioned as such coatings are not only very hard but also withstand extremely high temperatures and the attack of many corrosive media with the aluminum oxide having sufficient strength to withstand the thermal and mechanical stresses of many wear applications. An oxide-aluminum composite is available in wire form for oxyacetylene spraying. While no firing is required with that composite, the same sharpening procedure is followed.

The above procedure may be used to coat the blade, the razor blade 16, for example, and the blade 16 may be made of aluminum with this procedure. A simpler and preferred method, however, is to anodize aluminum where it is used as the base material of the work piece with the edge completed in accordance with the invention as above set forth.

To make comparisons of sharpness and durability, samples of product were made and tested by the following methods and procedures using cannula and wire to produce edges of known relative sharpness and by the described means, subject these edges to wear and erosion as during usage, and compare the results. Although the hypodermic needle is only one example of the use of such an edge, the means for comparison of sharpness was more readily arrived at. The procedure in each case was as follows:

1. Clean the base material — ultransonically with commercial cleansers (Oakite 33 and Oakite 102).
2. Apply the desired coating, where used, by plating, fired spray ceramic, and anodizing.
3. Grind on equipment described by Keeleric, U.S. Pat. No. 2,828,450 and schematically shown in FIGS. 10 and 11.
4. Clean ultrasonically through five stages using 300 watt Branson Ultrasonic number LTH80-6 (4 Watts/sq.in.) and five rinses both ultrasonic and spray. All water used in cleaning was de-ionized by a Barnstead unit and at less than five parts/million solids.
5. Test on unit for penetration shown schematically in FIG. 12 comprising a chuck 34 for holding the finished cannula and supported by a constant speed (seven-eighths inch/min.) feed 35 for moving the needle edge into the test material 36, beef tongue, for example. The feed 35 includes a strain gauge, now shown, coupled to a recorder 37 plotting the pressure required for penetration of the needle as it moves into the test material. Each test required the needle to penetrate one-fourth inch and through a series of twenty such penetrations plotting the peak of each penetration indicated whatever the changes of sharpness were through the change of pressure required to effect this penetration. A composite curve was then drawn showing the change in each test piece due to wear and erosion.

Tests were made on the following combinations:
1. 0.016 music wire conventionally ground and honed.
2. 0.016 (27 Ga) 304 cannula conventionally ground and honed.
3. 0.016 (27 Ga.) 304 cannula electrolytically ground (no coating).
4. 0.016 (27 Ga.) 304 cannula electrolytically ground (0.0001 rhodium plated).
5. 0.016 (27 Ga.) 304 cannula electrolytically ground (0.0001 platinum plated).
6. 0.016 (27 Ga.) 304 cannula electrolytically ground (ceramic coated 1 mil).
7. 0.016 music wire electrolytically ground (no coating).
8. 0.016 music wire electrolytically ground (0.0001 rhodium plate).
9. 0.017 aluminum wire electrolytically ground (no coating).
10. 0.016 aluminum wire electrolytically ground (anodized).

Figure 13:
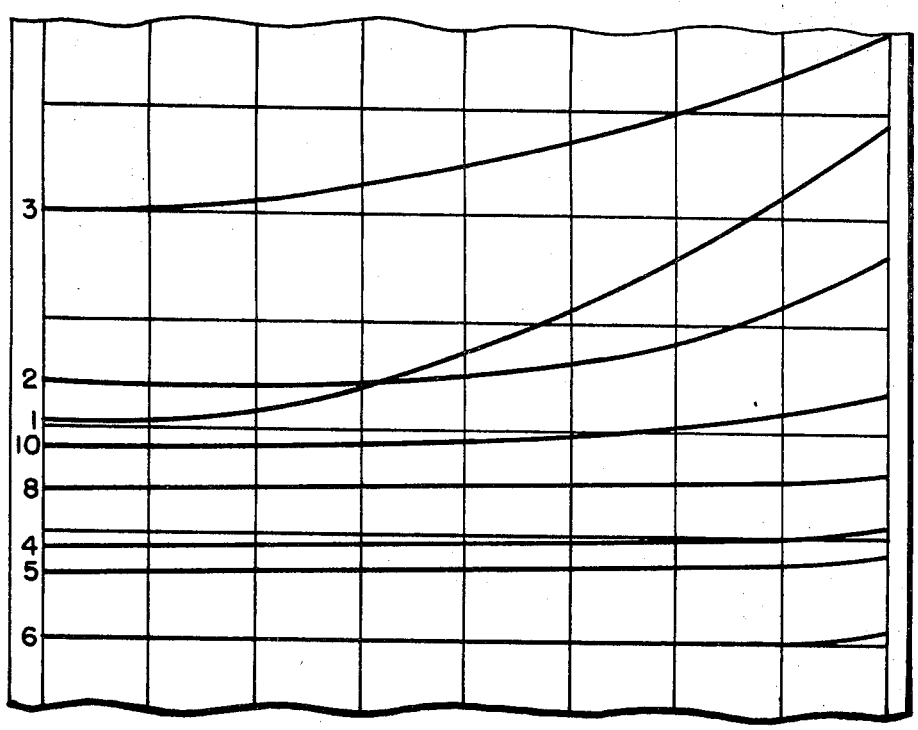
FIG. 13 is a view showing graphic comparison of edges of various elements.

The test numbers are used in FIG. 13 to identify the results of the tests, the upward curves indicating the extent to which the edge of each test piece changed during its repeated insertion into the test material. Tests 7 and 9 are not recorded as the edges rounded excessively. Each test line indicated its relative sharpness with test line 3 representing the dullest edge.

Figure 10:
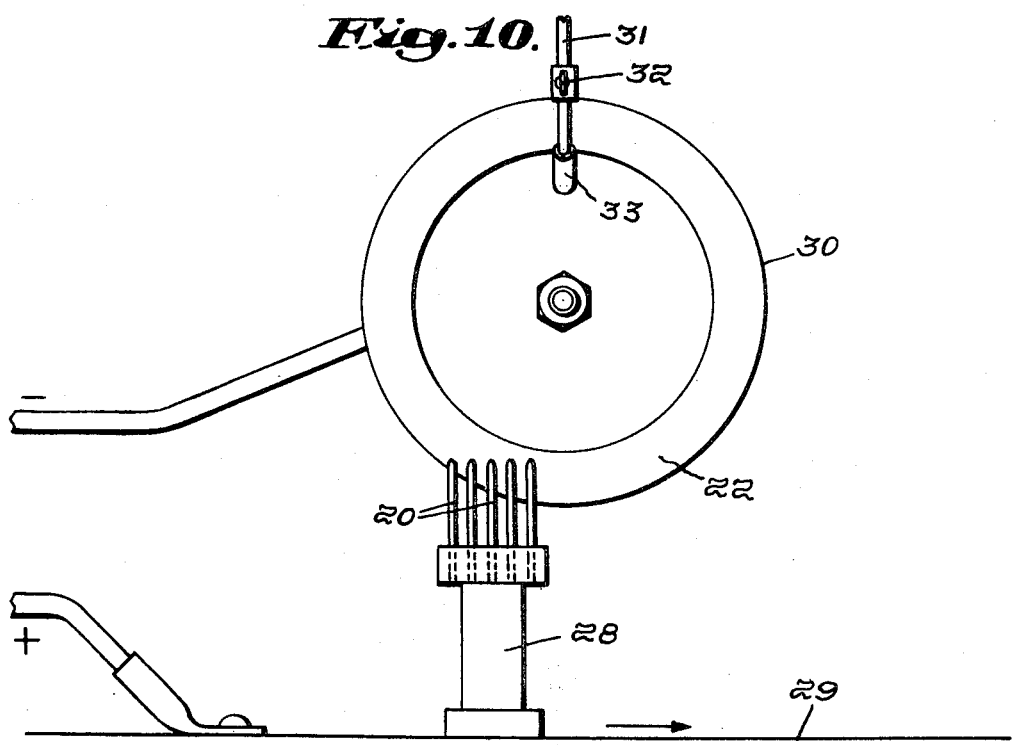
FIG. 10 is a somewhat schematic view of equipment used in the practice of the invention, the electrolytic grinding wheel being shown as seen from its working face.
Figure 11:
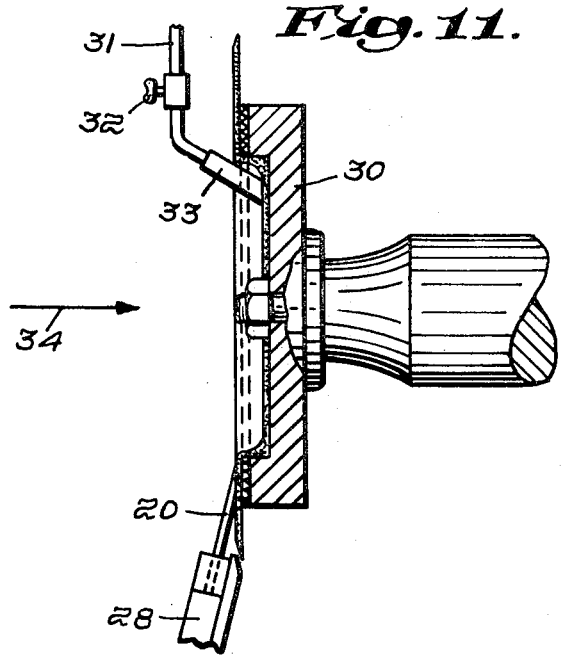
FIG. 11 is a section, on an increase in scale, taken approximately along the indicated lines 11—11 of FIG. 10.

Referring first to FIGS. 10 and 11, it will be seen that a fixture 28 is mounted on a table 29 reciprocable along a path to bring the coated ends of tubing 20 into operative relationship with the face 22 of the electrolytic wheel 30 to which the electrolyte is delivered through a conduit 31 having a valve 32 and terminating in a rubber hose end section 33. In practice, an air stream, indicated at 34, is created axially against the wheel 30. The fixture is shown, see FIG. 11, as holding the tubing 20 at an angle of 12° – 13° relative to the working face of the wheel 30.

The various platings are applied using proprietary solutions provided by Marlane Development, Inc., New York City, and deposited by Selectrons Ltd. No. 2530 power supply. All were controlled through the use of an ampere/hour meter recording in increments of 0.001. The area plated was the first one-quarter inch of the tubing or wire and was electrolytically cleaned, activated, nickel flashed and plated. Any standard method meeting specifications, however, will produce the same results. The anodizing was also done on the Selectron equipment, Marlane sulfuric anodizing solution, and produced according to standard methods. It was sealed in ultra pure water. Any standard method meeting MIL specifications, however, will produce the same results.

The needles, when conventionally ground, were ground on a Bay State Abrasive Co. wheel especially made for the production of hypodermic cannula. A uniform single bevel point of 12° – 13° was used in all tests. The combined process was done with equipment such as that manufactured by Hammond Machinery Co., Inc. with a 10 inch diameter electrolyte type face grinding wheel especially made in accordance with the invention to have the abrasive in the desired lapping range.

The solution used for grinding all of the needles was Anocut number 90, a proprietary product of Anocut Engineering Company of Chicago. However, upon analysis, this appears to be 39.63% $N_aC_1$ and the remainder Rochelle Salts ($C_4H_4KN_aO_6 \cdot 4H_2O$). This solution proved quite satisfactory on aluminum also although potassium chloride at 2-½ lb./Gal. was also tried without markedly differing results.

Figure 12:
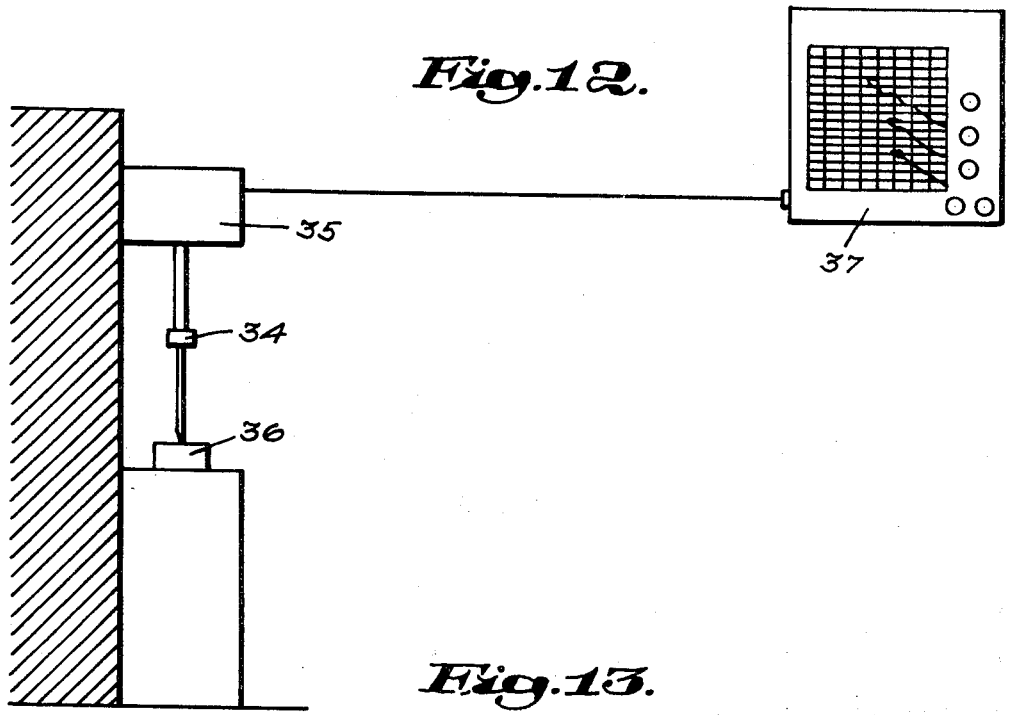
FIG. 12 is a schematic view illustrating equipment used in edge testing.

The results determined that a sharper point could initially be arrived at by the hard coating electrolytically ground than by the same material not coated and that the edge thus obtained was more durable in use (see FIG. 12).

Tests were also made on single edge razor blades of the injector type, such blades being stainless steel rhodium plated, stainless steel platinum plated, carbon tool steel rhodium plated, phosphor bronze rhodium plated, aluminum anodized. The treatment was accomplished in similar fashion with the same electrolyte. The resultant edges produced were similar to those produced on the needle but no satisfactory method of sharpness comparison was available. Therefore, the bulk of experimentation and test was done with the described hypodermic needle shaped edge.

The following metals or their alloys, while not used in making comparative tests; ruthenium, osmium, palladium, titanium, and tantalum are well adapted for use in accordance with the invention in providing sharp and durable cutting edges substantially equal to those used in the above summarized tests. Indium was deemed impractical as a cutting edge.

While the usual rotatable electrode has abrasive particles embedded in its working surface, either a side face of the periphery thereof, the abrasives used in accordance with the invention are not intended to remove work piece material. Electrolytic grinding is a misnomer in the present case in that work piece material is always electro-chemically eroded beyond the path of the working face of the electrode. As is well known to those familiar with the removal of work piece material by electrochemical erosions with rotatable electrodes carrying abrasive particles embedded in their working faces, the surface from which metal is removed by electrolytic attack is also attacked by the abrasive but the marks left thereby are eliminated if the electrolytic attack is continued long enough. In addition the area from which metal is removed by electrolytic attack does not exactly conform to the working surface of the rotatable electrode, i.e., it will not be truly flat, in the case where a side of the wheel is the working surface, and it will not be truly arcuate in the event the periphery of the wheel is the working surface.

Reference is made to FIG. 2 in which the path of the abrasive on the periphery of a rotatable electrode is indicated. FIG. 15 is a similar section illustrating the shape of the electro-chemical erosion and its relation to said path after the sharpening operation has been completed.

Figure 14:
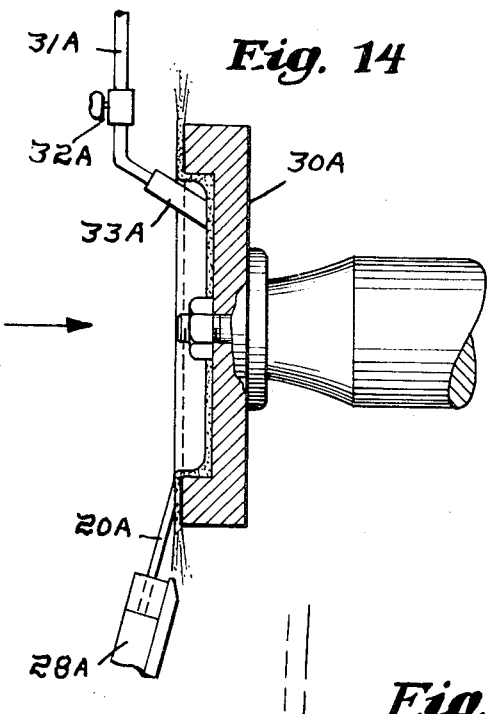
FIG. 14 is a view, similar to FIG. 11, but with a wheel that is free of abrasives and the abrasive carried by the electrolyte.

Reference is also made to FIG. 14 which shows equipment similar to that shown in FIG. 11 with corresponding parts distinguished by the suffix addition "A" to the appropriate reference numerals. The differences in the equipment achematically shown in FIG. 14 are that the working face of the wheel 30A has no abrasive and that the electrolyte delivered thereto through the nozzle 33A is the carrier of the abrasive particles, the dimensions of which are in the lapping range. A device sharpened by the equipment of FIG. 15 would be indistinguishable from a similar one sharpened by use of the equipment of FIG. 11.

It should be noted that with the size of abrasives used in accordance with the present invention, if mechanical grinding of the work piece material was attempted it would result in the rotatable electrode quickly becoming so clogged as to become unuseable in fine grinding the exposed edge of the added layer.

From the foregoing, it will be appreciated that the invention makes possible, on simple and efficient bases, extremely sharp edged devices that are usually, but not necessarily not to be resharpened. While preferred base metals have been mentioned, this was for the purpose of presenting preferences and not intended to be limiting as any base material can be used that reacts as a metalloid in electrolytic grinding and for which an electrolyte may be compounded that does not equally attack to any substantial extent the surface coating that is to become the ultimate cutting edge. As the abrasive in the electrolytic grinding wheel can be diamond and as the amount of material to be mechanically ground is minimal, the surface coatings are limited only by the requirements that they are suitable as an edge material for a particular use or uses and that they be relatively unaffected by an electrolyte suitable for removal of the base material of the work piece. As previously stated abrasive particles of a size larger than the indicated range cannot be used.

I claim:

1. The method of making a sharp-edged cutting element that comprises the steps of adding a thin layer to at least a portion of only one of two opposed surfaces of a work piece of a metal subject to electrolytic attack and capable of having a cutting edge formed thereon and useful as blade and cannula stock, the added layer being less than 0.010 of an inch in thickness and of a material capable of being fine-ground to establish the sharp cutting edge of the element and selected from the group consisting of platinum, rhodium, ruthenium, palladium, osmium, titanium, tantalum and their alloys, oxidized aluminum, and ceramics, and electrolytically removing work piece metal from the other of said work piece surfaces in an area to expose the edge of said added layer at said portion of the work piece and simultaneously fine-grinding the exposed edge of the layer with an abrasive whose maximum size is in the order of 50 microns to so taper it as to form said sharp cutting edge, the material of said added layer being so inert with respect to the action of the electrolyte as to be substantially unaffected thereby while being fine ground.

2. The method of claim 1 in which the work piece material is a metal selected from the metal group consisting of steel, aluminum, and their alloys.

3. The method of claim 1 in which the work piece material is aluminum and the added layer is the anodized product thereof.

4. The method of claim 1 in which the work piece material is stainless steel and the added layer is selected from the following materials of the group rhodium, iridium, and platinum.

5. The method of claim 1 in which the work piece is tubular, the added layer extends to one end thereof, the electrolyte flows through the tubular work piece from the other end thereof to said one end and the abrasive is carried by the electrolyte.

6. The method of claim 1 in which the surface layer is established chemically.

7. The method of claim 1 in which the surface layer is formed by electroplating.

8. The method of claim 1 in which the surfaces are established by rolling the material of the surface layer on the base layer.

9. The method of claim 1 in which the surface layer is produced electrochemically.

10. The method of claim 1 in which the surface layer is formed by flame spraying.

11. The method of claim 1 in which the step of electrolytically removing work piece material and simultaneously fine grinding the exposed edge of the added layer is effected with a rotatable electrode provided with a working face in which the abrasive particles are embedded and against which a stream of the electrolyte is directed.

12. The method of claim 1 in which the step of electrolytically removing work piece material and simultaneously fine grinding the exposed edge of the added layer is effected with a rotatable electrode provided with a working face against which a stream of the electrolyte is directed, the abrasive particles being carried by the stream.

* * * * *

UNITED STATES PATENT OFFICE
CERTIFICATE OF CORRECTION

Patent No. 3,762,243           Dated October 2, 1973

Inventor(s) Richard A. Brookfield

It is certified that error appears in the above-identified patent and that said Letters Patent are hereby corrected as shown below:

On the cover sheet item [75] the inventor's name should read as follows: -- Richard A. Brookfield --.

Signed and sealed this 30th day of April 1974.

(SEAL)
Attest:

EDWARD M. FLETCHER, JR.                C. MARSHALL DANN
Attesting Officer                      Commissioner of Patents